US009455486B2

(12) United States Patent
Chen et al.

(10) Patent No.: US 9,455,486 B2
(45) Date of Patent: Sep. 27, 2016

(54) INTEGRATED CIRCULATOR FOR PHASED ARRAYS

(71) Applicant: The Boeing Company, Chicago, IL (US)

(72) Inventors: Ming Chen, Bellevue, WA (US); Jimmy S. Takeuchi, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 13/935,342

(22) Filed: Jul. 3, 2013

(65) Prior Publication Data

US 2015/0011168 A1 Jan. 8, 2015

(51) Int. Cl.

*H04B 1/38* (2015.01)
*H01P 1/387* (2006.01)
*H01P 1/36* (2006.01)
*H01Q 21/00* (2006.01)

(52) U.S. Cl.

CPC ................ *H01P 1/387* (2013.01); *H01P 1/36* (2013.01); *H01Q 21/0006* (2013.01)

(58) Field of Classification Search

CPC ........... H01B 1/38; H01Q 21/00; H01P 1/36; H01P 1/39; H01P 1/387
USPC ....... 455/73, 80, 81, 280, 282; 333/1.1, 24.2
See application file for complete search history.

(56) References Cited

U.S. PATENT DOCUMENTS 5,185,587 A 2/1993 Kurian et al.
6,563,394 B1 5/2003 Kudo et al.
6,867,661 B2 3/2005 Dawn et al.
7,256,661 B2 * 8/2007 Chen et al. .................... 333/1.1
7,495,521 B2 2/2009 Chen et al.
8,344,820 B1 * 1/2013 Chen et al. .................... 333/1.1
8,391,958 B2 * 3/2013 Cawley et al. ............... 600/431
2001/0045872 A1 11/2001 Miura et al.
2002/0135434 A1 9/2002 Emanuelsson
2002/0190808 A1 12/2002 Paquette et al.
2006/0139118 A1 * 6/2006 Vaughn .................. H01P 1/387 333/1.1
2006/0226924 A1 10/2006 Chen et al.
2010/0182204 A1 * 7/2010 Hao .................... H01Q 9/0421 343/702

FOREIGN PATENT DOCUMENTS

GB 2059171 A 4/1981
JP 60223201 A 11/1985

OTHER PUBLICATIONS

Fay, E.E., and Comstock, R.L., Operation of the Ferrite Junction Circulator, IEEE Transactions on Microwave Theory and Techniques, 1965.
Bosma, H., On Stripline Y-Circulation at UHF, IEEE Transactions on Microwave Theory and Techniques, 1965.
Combined Search and Examination Report, GB Application No. GB1411339.3; Date of Mailing: Nov. 14, 2014, (Ref. No. P60535GB/NJDS), 8 pages.
Examination Report under Section 18(3); GB Application No. GB1411339.3; Intellectual Property Office—United Kingdom; Date of Mailing: Jul. 24, 2015; (Ref. No. P60535GB/NJDS), 3 pages.

* cited by examiner

*Primary Examiner* — Tuan Pham
(74) *Attorney, Agent, or Firm* — Toler Law Group, PC

(57) ABSTRACT

A circulator/isolator assembly to operate within a first frequency range is disclosed. The assembly includes a first magnetic substrate having a first surface and a second surface and a first ground plane formed on the first surface, a dielectric layer disposed adjacent the first magnetic substrate, the dielectric layer comprising a multi-port junction circuit disposed on a first side of the dielectric layer and dimensioned to be resonant within the first frequency range, the multi-port junction circuit comprising a conductive disk coupled to a plurality of RF transmission traces, a first RF transmission trace forming an input port and a second RF transmission trace forming an output port, a ground plane disposed on a second side of the dielectric layer, and a first magnetic cylinder disposed proximate the multi-port junction circuit of the dielectric layer.

23 Claims, 8 Drawing Sheets

PRIOR
ART

INTEGRATED CIRCULATOR FOR PHASED ARRAYS

BACKGROUND

The subject matter described herein relates to circulators and isolators used in RF devices, and more particularly to an integrated circulator or isolator having a packaging configuration suited for use with phased array antenna systems and other RF devices where space and packaging limitations preclude the use of conventional circulators or isolators.

In phased array antennas, radar systems and various other forms of electronic sensor and communications systems or subsystems, ferrite circulators and isolators provide important functions at RF front end circuits of such systems. Typically, such devices, which can be broadly termed "non-reciprocal electromagnetic energy propagation" devices, are used to restrict the flow of electromagnetic wave energy to one direction only to/from an RF transmitter or RF receiver subsystem. Circulators and isolators can also be used for directing transmitting and receiving electromagnetic energies into different channels and as frequency multiplexers for multi-band operation. Other applications involve protecting sensitive electronic devices from performance degradation or from damage by blocking incoming RF energy from entering into a transmitter circuit.

A conventional microstrip circulator device consists of a ferrite substrate with RF transmission lines metalized on the top surface to form three or more ports. A ground plane is typically formed on the backside of the substrate, as illustrated in FIGS. 1 and 2. An isolator is simply a circulator with one of the three ports terminated by a load resistor.

A circulator device uses the gyromagnetic properties of the ferrite material, typically yttrium-iron-garnet (YIG), for its low loss microwave characteristics. The ferrite substrate is biased by an external, static magnetic field from a permanent magnet. The magnetization vector in the ferrite substrate processes in only one circular direction, thus forming a non-reciprocal path for electromagnetic waves to propagate, as indicated by arrows in FIG. 1. The higher the operating frequencies, however, the stronger the biasing field that is required, which necessitates a stronger magnet.

A phased array antenna is an antenna formed by an array of individual active module elements. In applications involving phased array antennas, each radiating/reception element can use one or more such ferrite circulators or isolators in the antenna module. However, incorporating any device into the already limited space available on most phased array antennas can be an especially challenging task for the antenna designer. The space limitations imposed in phased array antennas is due to the fact that the spacing of the radiating/reception elements of the array is determined in part by the maximum scan angle that the antenna is required to achieve, and in part by the frequency at which the antenna is required to operate. For high performance phased array antennas, this spacing is typically close to one half of the wave length of the electromagnetic waves being radiated or received. For example, a 20 GHz antenna would have a wavelength of about 1.5 cm or 0.6 inch, thus an element spacing of merely 0.75 cm or 0.3 inch. This spacing only gets smaller as the antenna operating frequency increases. Thus, a conventional circulator device (e.g., a conventional microstrip circulator) has physical size constraints in all 3 dimensions due to its having a ferrite substrate with metalized RF transmission lines on the substrate and a permanent magnet attached therewith.

As a consequence, a conventional microstrip circulator/isolator requires mounting on a phased array module circuit board made of a non-magnetic substrate material totally different from that of the ferrite substrate. Complicating matters further, the size of the ferrite circulator/isolator does not scale down as the operating frequency increases because of the need for a stronger permanent magnet with the increasing operating frequency. The need for a stronger permanent magnet is harder to meet due to material constraints. Furthermore, wire bonding connections are required for connecting conventional circulator/isolator ports with the rest of a microwave circuit. Accordingly, the packaging of a conventional circulator/isolator becomes more and more difficult and challenging within phased array antennas as the operating frequency of the antenna increases or its performance requirements (i.e., scan angle requirement) increases. These same packaging limitations are present in other forms of RF devices where there is simply insufficient space to accommodate a conventional circulator or isolator.

Accordingly, circulator/isolator assemblies may find utility in RF communication applications.

SUMMARY

In one aspect, a circulator/isolator assembly to operate within a first frequency range is disclosed that includes a first magnetic substrate having a first surface and a second surface and a first ground plane formed on the first surface, a dielectric layer disposed adjacent the first magnetic substrate, the dielectric layer comprising a multi-port junction circuit disposed on a first side of the dielectric layer and dimensioned to be resonant within the first frequency range, the multi-port junction circuit comprising a conductive disk coupled to a plurality of RF transmission traces, a first RF transmission trace forming an input port and a second RF transmission trace forming an output port, a ground plane disposed on a second side of the dielectric layer, and a first magnetic cylinder disposed proximate the multi-port junction circuit of the dielectric layer, such that the first magnetic cylinder excites a circular, unidirectional magnetic flux field in the first magnetic substrate that limits electromagnetic wave propagation to a single direction of the multi-port circuit junction circuit.

In another aspect, an antenna assembly is disclosed. The assembly includes a first radiating element, a second radiating element, and a circulator/isolator assembly that includes a first magnetic substrate having a first surface and a second surface and a first ground plane formed on the first surface, a dielectric layer disposed adjacent the first magnetic substrate, the dielectric layer comprising a multi-port junction circuit disposed on a first side of the dielectric layer and dimensioned to be resonant within the first frequency range, the multi-port junction circuit comprising a conductive disk coupled to a plurality of RF transmission traces, a first RF transmission trace forming an input port and a second RF transmission trace forming an output port, a ground plane disposed on a second side of the dielectric layer, and a first magnetic cylinder disposed proximate the multi-port junction circuit of the dielectric layer, such that the first magnetic cylinder excites a circular, unidirectional magnetic flux field in the first magnetic substrate that limits electromagnetic wave propagation to a single direction of the multi-port circuit junction circuit.

In another aspect, a method to channel one or more communication signals through a transmit/receive module in a wireless communication system comprises receiving one or more communication signals in the transmit/receive module and passing the communication signal through at least one communication channel comprising a circulator/isolator assembly. The circulator/isolator assembly comprises a first magnetic substrate having a first surface and a second surface and a first ground plane formed on the first surface, a dielectric layer disposed adjacent the first magnetic substrate, the dielectric layer comprising a multi-port junction circuit disposed on a first side of the dielectric layer and dimensioned to be resonant within the first frequency range, the multi-port junction circuit comprising a conductive disk coupled to a plurality of RF transmission traces, a first RF transmission trace forming an input port and a second RF transmission trace forming an output port, a ground plane disposed on a second side of the dielectric layer, and a first magnetic cylinder disposed proximate the multi-port junction circuit of the dielectric layer, such that the first magnetic cylinder excites a circular, unidirectional magnetic flux field in the first magnetic substrate that limits electromagnetic wave propagation to a single direction of the multi-port circuit junction circuit.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, and components have not been illustrated or described in detail so as not to obscure the particular embodiments.

Various examples of circulator assemblies are described and claimed in commonly assigned U.S. Pat. Nos. 5,256,661, 7,495,521, and 8,344,820, all to Chen, et al, the disclosures of which are incorporated herein by reference. In brief, this application describes alternate constructions of circulator assemblies which may be used in phased array antenna structures.

Figure 1:
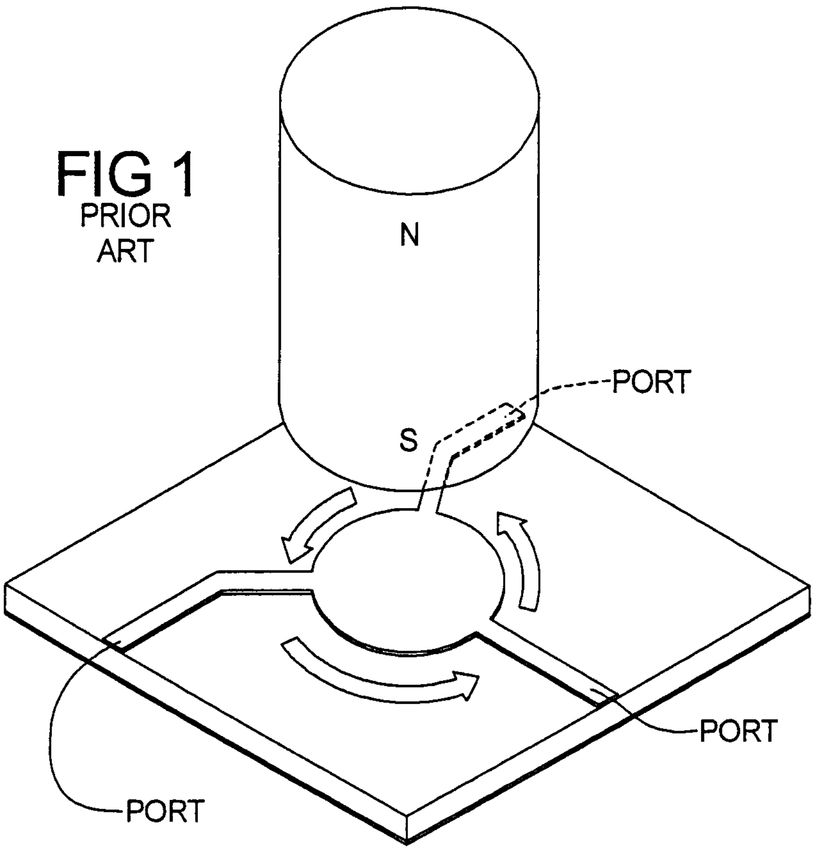
FIG. 1 is a top perspective view of a prior art circulator/isolator with a permanent bar magnet shown separated from one surface of a substrate.
Figures 2A, 2B:
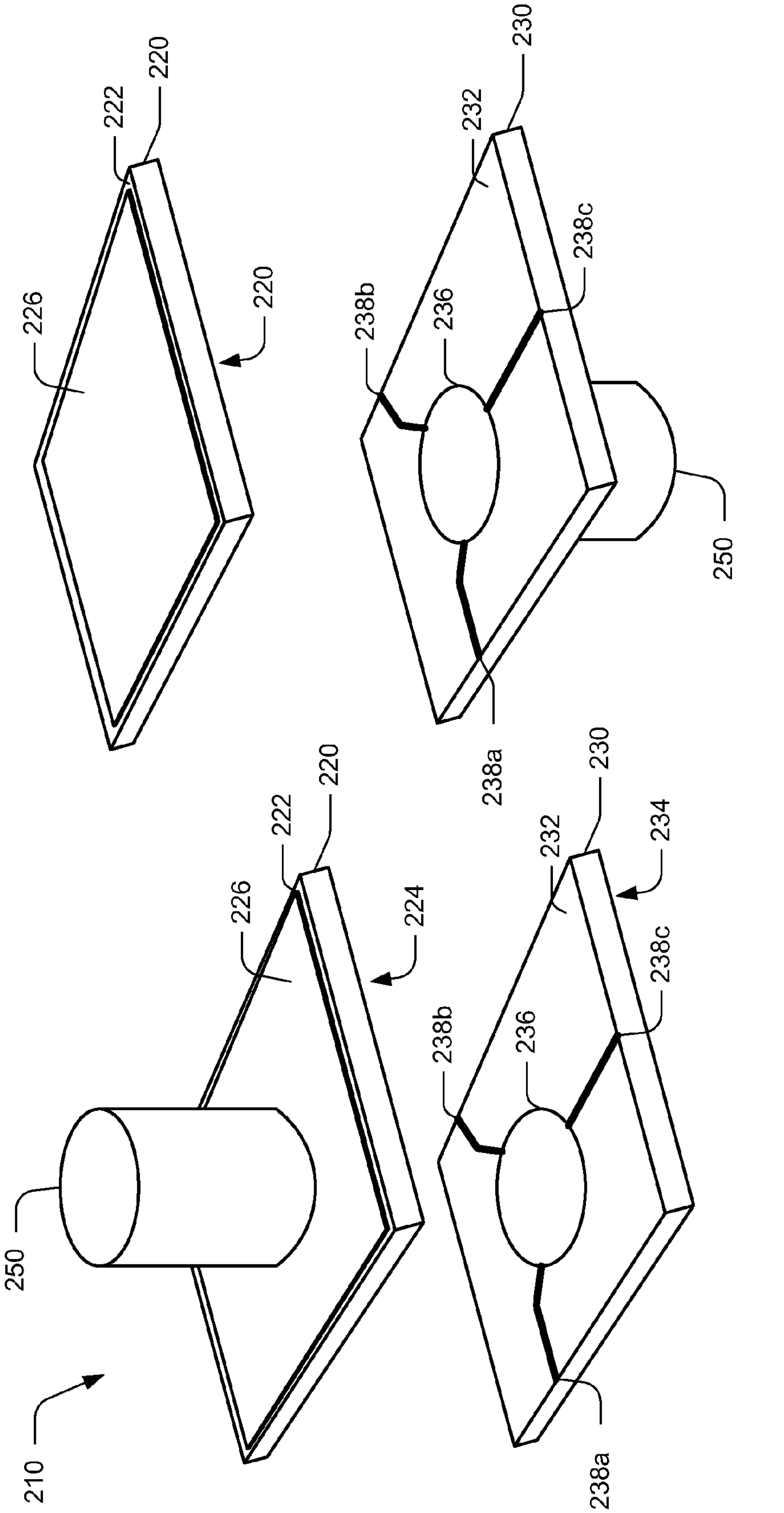
FIGS. 2A-2I are schematic, exploded perspective views of a circulator/isolator assembly in accordance with various embodiments.

FIGS. 2A-2E are exploded, perspective views of a circulator/isolator assembly 210 in accordance with various embodiments. Referring first to FIG. 2A, in one embodiment a circulator/isolator assembly 210 comprises a first magnetic substrate 220, a dielectric layer 230 comprising a multi-port junction circuit 236 coupled to a plurality of RF transmission traces 238, and a magnet 250 disposed proximate the multi-port junction circuit 236 of the dielectric layer 230.

The first magnetic substrate 220 has first surface 222, which appears as the upper surface in FIG. 2A, and a second surface 224 which appears as the lower surface in FIG. 2A. The first magnetic substrate 220 may vary in dimensions. For instance, in one implementation for the Ku band frequency, the first magnetic substrate 220 measures approximately 0.28 inch (7.1 mm) in length and width and has an overall thickness of approximately 0.02 inch (0.5 mm).

In one embodiment, the first magnetic substrate 220 is formed from a material that comprises yttrium iron garnet ferrite (YIG) substrates that are formed in a planar configuration. Other suitable materials for the first magnetic substrate 220 may include ferrites such as spinel or hexagonal, which are chosen depending on the required operational frequency and other performance parameters. Please note that ferrites exhibit excellent ferromagnetic properties, e.g., susceptible to induction, non-conductive, and low loss materials and that other ferromagnetic substrate materials may also be utilized for the first magnetic substrate 220.

In one embodiment, a top surface 226 includes a first ground plane is formed on the first surface 222 of the first magnetic substrate 220. In some embodiments the top surface 226 includes a ground plane formed as a metalized layer on the first surface 222 of the first magnetic substrate 220. In the embodiment depicted in FIG. 2A the top surface 226 (e.g., a ground plane 226) covers substantially an entirety of the first surface 222 of the first magnetic substrate 220. In alternate embodiments the top surface 226 may only have a ground plane on a portion of the first surface 222 (not shown).

The first magnet 250 may also vary in dimensions depending upon the strength of the magnetic field that is needed. In one embodiment, the magnet 250 has a height of about 0.1 inch (2.5 mm) and a diameter of about 0.1 inch (2.5 mm). While shown as a circular magnet, the first magnet 250 could comprise other shapes such as triangular, rectangular, octagonal, etc. Similarly, the first magnetic substrate 220 and/or the multi-port junction circuit 236 could also comprise other shapes such as triangular, rectangular, octagonal, etc. The magnetic field strength of the magnetic 250 may vary considerably to suit a specific application, but in one implementation is between about 1000 Gauss-3000 Gauss. For millimeter wave applications (30 GHz-60 GHz), the strength of the magnetic field may be as high approximately 10,000 Gauss. Any magnet that can provide such field strengths without affecting the microwave fields (thus being non-conductive) may be utilized. Electromagnets could potentially be used for many applications for reduced magnetic strength requirements. Permanent bar magnets widely available commercially from a number of sources could also be used for many applications.

A dielectric layer 230 is disposed adjacent first magnetic substrate 220. In some embodiments the dielectric layer 230 may be a portion of a printed circuit board (PCB) or any other conventional microwave substrate. By way of example, the dielectric layer 230 may be formed from a polytetrafluoroethylene (PTFE) material or a ceramic-based material such as alumina. The dielectric layer 230 comprises a multi-port junction circuit 236 coupled to a plurality of RF transmission traces 238*a*, 238*b*, 238*c*, which may be collectively referred to herein by reference numeral 238. The end portion of the transmission traces 238 may be considered input/output ports through which RF energy may be transmitted. The multi-port junction circuit 236 and transmission traces 238 may be formed on a surface of the dielectric layer 230 or may be embedded in the dielectric layer 230.

The assembly 210 may be assembled by positioning the first magnetic substrate 220 and the first magnet 250 proximate the multi-port junction circuit 236 of the dielectric layer 230, which may be part of a microwave circuit assembly. The first magnet 250 excites a circular, unidirectional magnetic flux field in the first magnetic substrate 220 that limits electromagnetic wave propagation to a single direction the multi-port circuit junction 236 such that RF energy can flow in only one circular direction (unidirectional) between the ports defined by the RF transmission traces 238.

The assembly 210 shown in FIG. 2A can be configured as an isolator by electrically coupling one or more load resistors (not shown) to one of the ports defined by the RF transmission traces 238. For instance, a load resistor of 50 ohms (not shown) may connect RF transmission trace 238*b* to an electrical ground connection (not shown) to form an RF energy termination port to facilitate, for instance, RF energy circulation from RF transmission trace 238*a* to RF transmission trace 238*c*.

FIG. 2B is a schematic, exploded perspective view of an alternate embodiment of a circulator/isolator assembly 210. The respective components of the assembly 210 depicted in FIG. 2B are the same as the components depicted in FIG. 2A. The principle difference between the embodiments depicted in FIGS. 2A and 2B is that the first magnet 250 is disposed on the second surface 234 of the dielectric layer 230, rather than on the top surface 226 of the first magnetic substrate 220. The assembly 210 may be assembled by positioning the first magnetic substrate 220 and the magnet 250 proximate the multi-port junction circuit 236 of the dielectric layer 230, which may be part of a microwave circuit assembly (e.g., antenna T/R module 700 illustrated in FIG. 4).

Figure 2D:
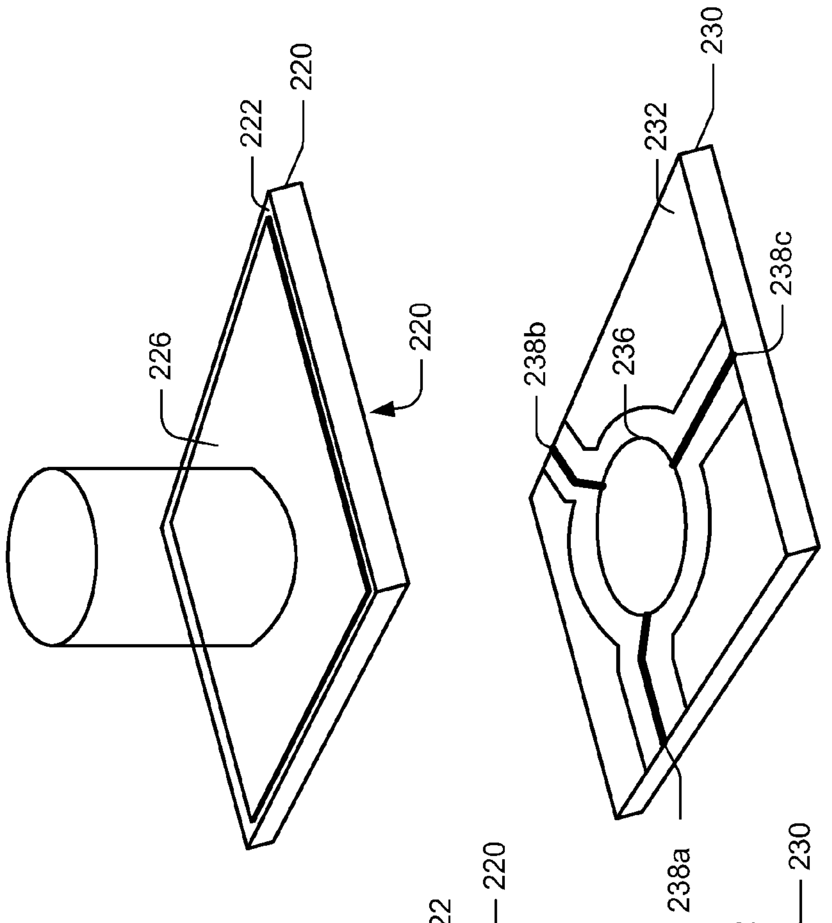
Figure 2C:
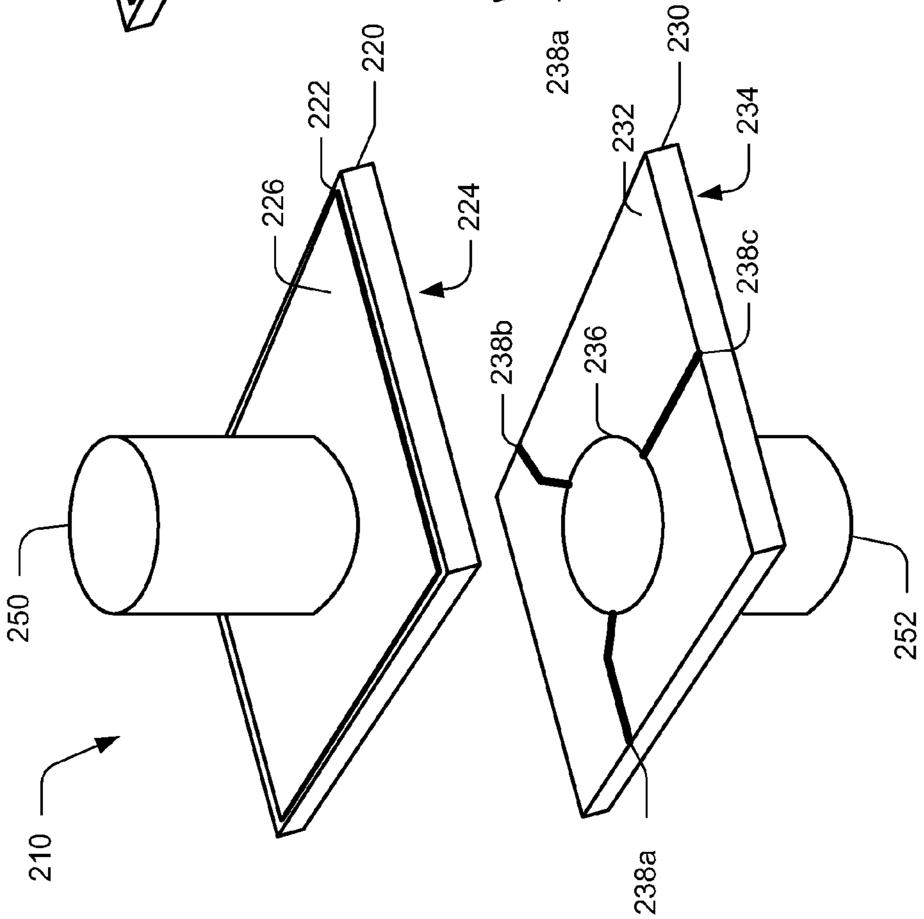

FIG. 2C is a schematic, exploded perspective view of an alternate embodiment of a circulator/isolator assembly 210. The respective components of the assembly 210 depicted in FIG. 2B are the same as the components depicted in FIG. 2A. The principle difference between the embodiments depicted in FIGS. 2A and 2C is the addition of a second magnet 252 disposed on the second surface 234 of the dielectric layer 230. The assembly 210 may be assembled by positioning the first magnetic substrate 220 and the first magnet 250 proximate the multi-port junction circuit 236 of the dielectric layer 230, which may be part of a microwave circuit assembly. Advantageously, the use of two magnets 250, 252 provides a stronger and more uniformly distributed magnetic flux field through the first magnetic substrate 220 and the dielectric layer 230.

FIG. 2D is a schematic, exploded perspective view of an alternate embodiment of a circulator/isolator assembly 210. The respective components of the assembly 210 depicted in FIG. 2D are the same as the components depicted in FIG. 2A. The principle difference between the embodiments depicted in FIGS. 2A and 2D is that the metal traces (traces 238 et. al) and the junction circuit 236 are surrounded by metal ground planes, transforming the microstrip circuit into a co-planar waveguide (CPW) circuit for the circulator.

Figure 2E:
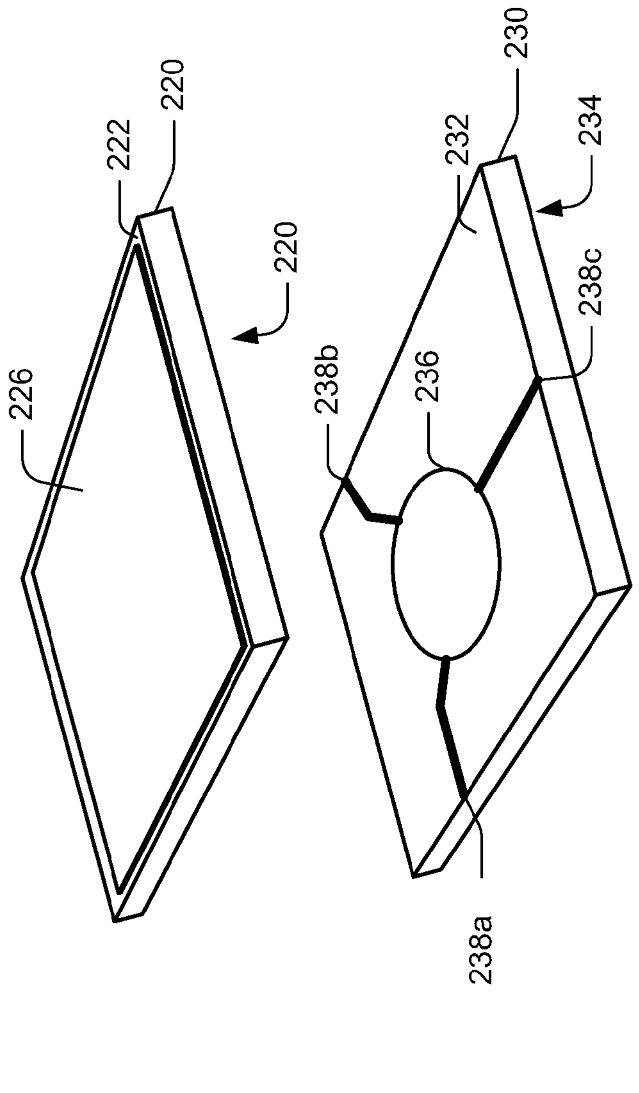

FIG. 2E is a schematic, exploded perspective view of an alternate embodiment of a circulator/isolator assembly 210. Many of the respective components of the assembly 210 depicted in FIG. 2E are the same as the components depicted in FIG. 2D. The principle difference between the embodiments depicted in FIGS. 2D and 2E is that the magnetic substrate 220 may be formed from a self-biasing ferrite material. By way of example, self-biasing ferrite materials may comprise at lest one of a barium ferrite doped with scandium or a hexaferrite material. Incorporating a self-biasing magnetic substrate 220 into the assembly 210 allows the magnet 250 to be omitted from the assembly 210.

Figure 2H:
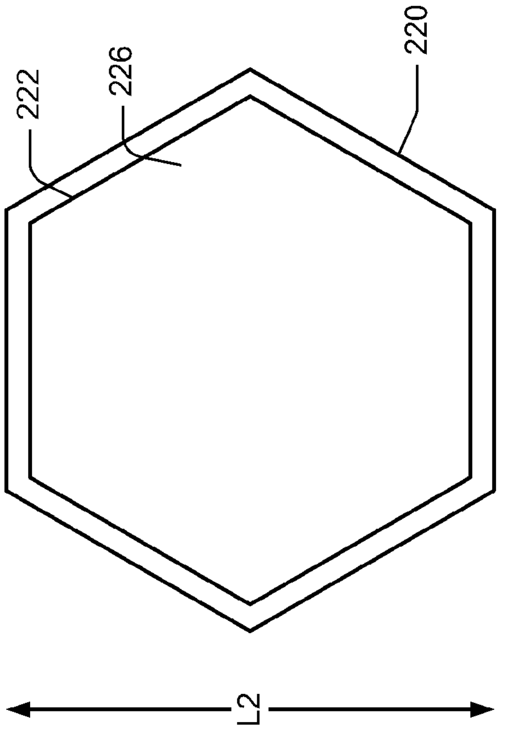
Figure 2I:
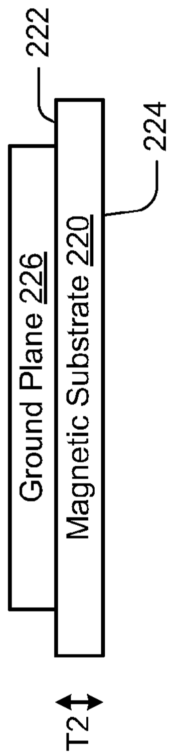
Figure 2F:
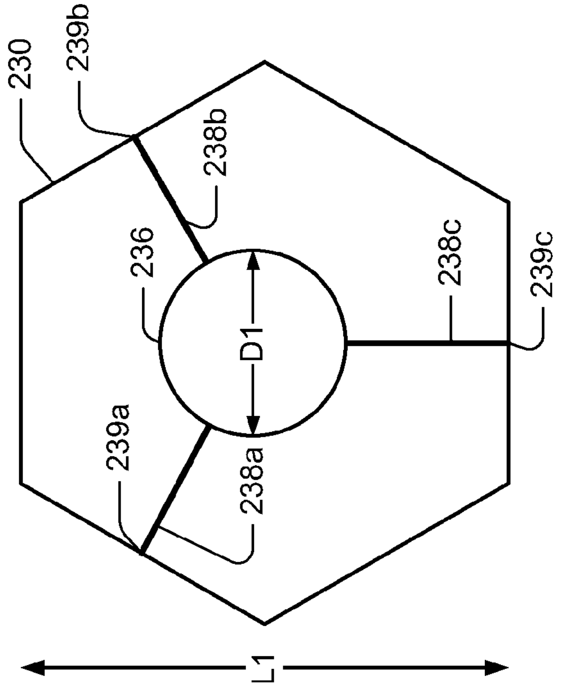
Figure 2G:

FIG. 2F is a plan view and FIG. 2G is a side view of components of a circulator/isolator assembly 210. Referring to FIGS. 2F-2G, in some embodiments the dielectric layer 230 may be formed in a substantially hexagonal shape such that the circuit traces 238*a*, 238*b*, 238*c* terminate on substantially flat surfaces to define input/output ports 239*a*, 239*b*, 239*c*. The dielectric layer 230 may comprise one or more layers which define a thickness indicated by T1 in FIG. 2G which measures between 0.02 inches and 0.05 inches. The hexagon may have a length indicated by L1 in FIG. 2F which measures between 0.05 inches and 0.1 inches. Suitable materials for forming dielectric layer 230 include Rogers 4003 laminate materials or other conventional printed circuit board (PCB) laminate materials.

The circuit traces 238 and junction circuit 236 may be formed on a first side of the dielectric material layer 230 using conventional circuit printing techniques. In some embodiments the junction circuit 236 has a diameter indicated by D1 on FIG. 2F which measures between 0.110 inches and 0.120 inches. Circuit traces 238 couple the junction circuit 236 to the output ports 239. A ground plane 240 may be formed on the opposite side of dielectric layer 230.

FIG. 2H is a plan view and FIG. 2I is a side view of components of a magnetic substrate 220. Referring to FIGS. 2H-2I, in some embodiments the magnetic substrate 220 may be formed in a substantially hexagonal shape having a length indicated by L2 in FIG. 2H which measures between 0.05 inches and 0.1 inches a thickness indicated by T2 in FIG. 2I which measures between 0.01 inches and 0.03 inches. Ground plane 226 may be disposed on a first surface 222 of magnetic substrate 220, as described above.

Advantageously, as illustrated in FIGS. 2A-2I, the first magnetic substrate 220 does not carry junction circuit traces (e.g., RF circuit traces 238*a*, 238*b*, 238*c*) as do many conventional circulator/isolators. Furthermore, advantageously the circulator/isolator device 210 may have a permanent magnetic positioned on either top (e.g., the magnet 250) and/or the bottom (e.g., the second magnet 252) to provide un-directional energy flow functionality.

Figure 3:
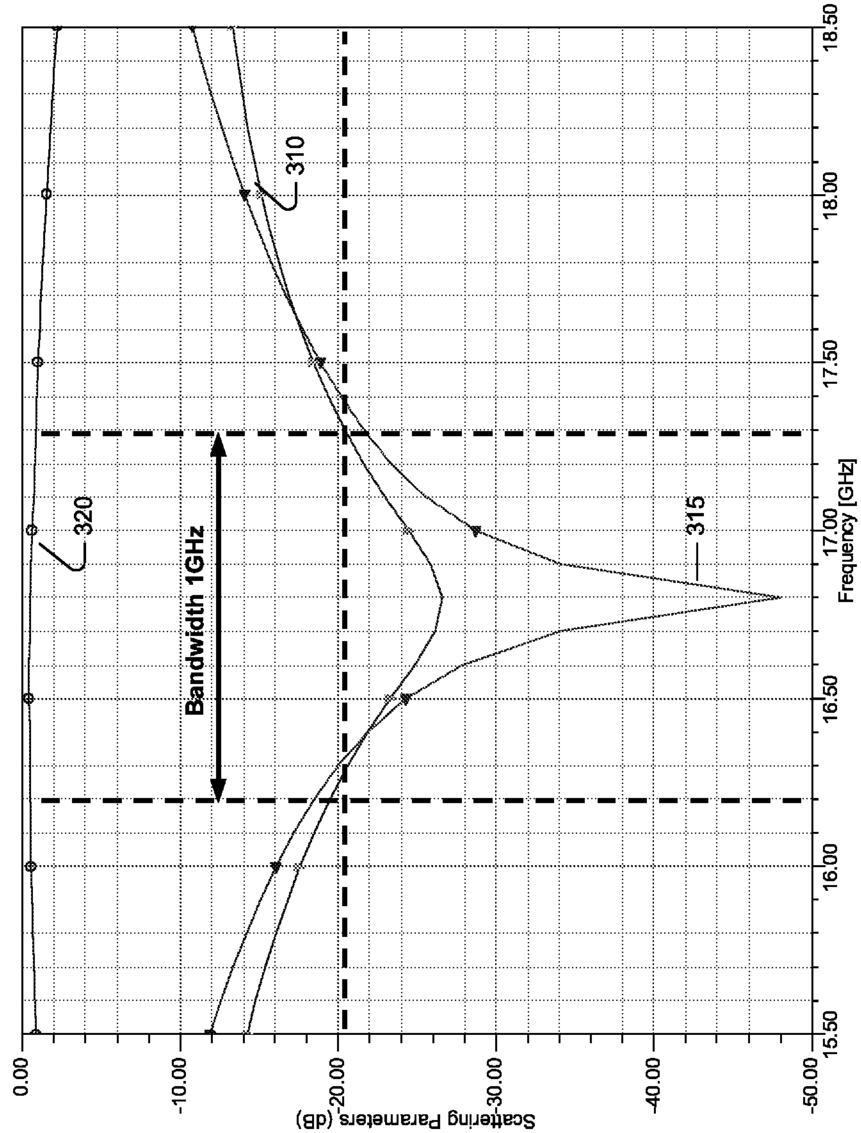
FIG. 3 is a graph illustrating performance parameters of a circulator/isolator assembly in accordance with various embodiments.

FIG. 3 is a graphs illustrating simulated performance parameters of a circulator/isolator assembly in accordance with various embodiments described herein. Referring to FIG. 3, curve 310 represents the isolation loss, curve 315 represents the input return loss, and curve 320 represents the insertion loss, each of which are plotted across a frequency spectrum extending from 15.5 GHz to 18.5 GHz. As illustrated by FIG. 3 the structure obtains less than −1 dB insertion loss and an isolation loss and return loss of approximately −20 dB over a frequency range extending from 16.3 GHz to 17.3 GHz.

Figure 4:
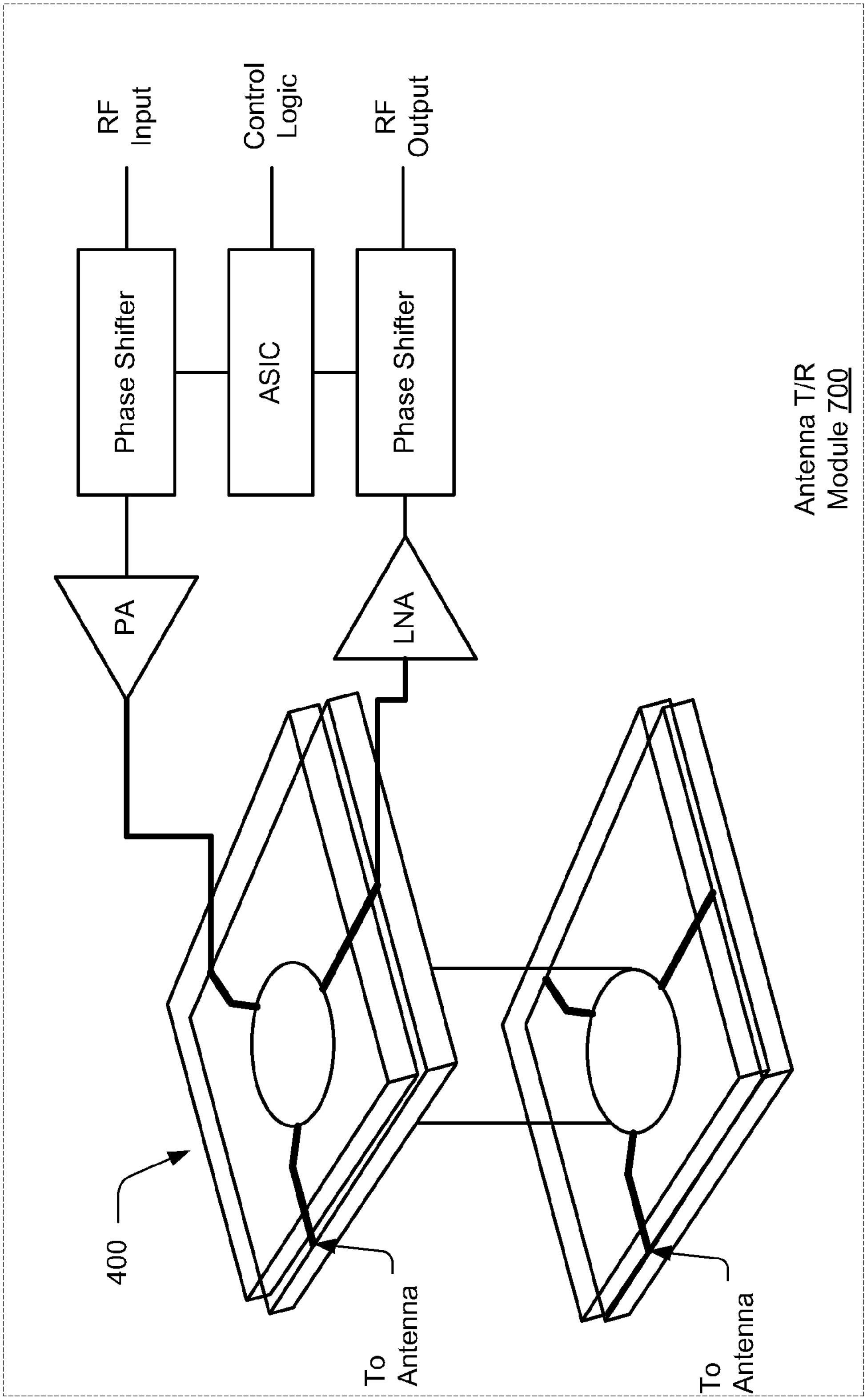
FIG. 4 is a perspective view of a circulator/isolator assembly in accordance with embodiments incorporated into a portion of a multi-channel phased array antenna.

In some embodiments one or more circulator assemblies (e.g., circulator/isolator 210) may be incorporated into a phased array antenna. Referring to FIG. 4, the circulator 400 is illustrated as being implemented in an exemplary phased array antenna transmit and receive (T/R) module 700. The exemplary transmit module illustrates an RF input signal coupled to a phase shifter operated by an application specific integrated circuitry (ASIC) and a power amplifier (PA) to produce an RF output though the circulator to an antenna. The exemplary receive module illustrates an RF signal from an antenna through the circulator coupled to a low noise amplifier (LNA) and a phase shifter integrated with an application specific integrated circuit (ASIC) to produce an RF signal output. Please note that the circulator/isolator 400, in practice, is electrically coupled to a pair of antenna radiator elements (not illustrated) to enable an RF T/R channel to be formed in the radiator elements to achieve, for instance, a dual beam antenna pattern or radiation directivity output. Specific phased array antenna embodiments and teachings in the following patents owned by The Boeing Company: U.S. Pat. Nos. 6,714,163; 6,670,930; 6,580,402; 6,424,313, as well as U.S. application Ser. No. 10/625,767, filed Jul. 23, 2003 and U.S. application Ser. No. 10/917,151, filed Aug. 12, 2004, all of which are incorporated by reference into the present application.

Figure 5:
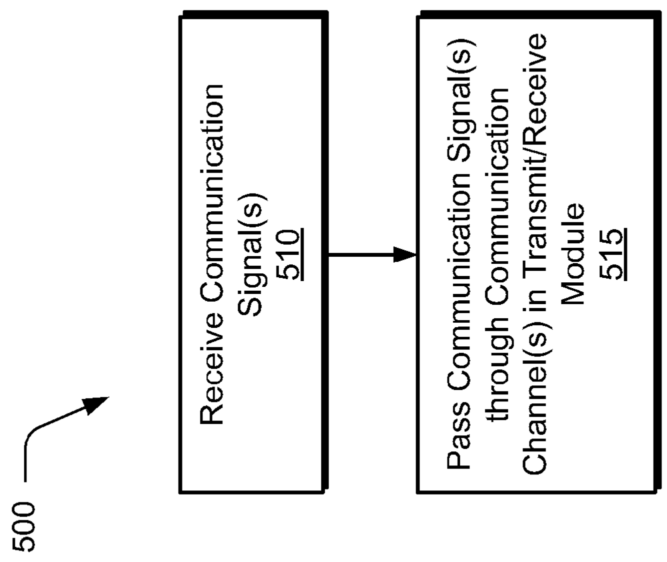
FIG. 5 is flowchart illustrating operations in a method to channel one or more communication signals through a transmit/receive module in a wireless communication system in accordance with various embodiments.

Referring to FIG. 5, a method 500 is disclosed to channel one or more communication signals through a transmit/receive module in a wireless communication system. Referring to FIG. 5, at operation 510 a communication signal, e.g., from an external device via a wireless communication link, is received in a transmit/receive module such as the antenna transmit/receive module 700 depicted in FIG. 4. In some embodiments the communication signal may be a signal received by the antenna from a remote wireless device. In such embodiments the communication signal would be an inbound signal from a phased array antenna element. In other embodiments the communication signal may be generated by circuitry in an electronic device coupled to the antenna transmit/receive module 700, i.e., an outbound signal to a phased array antenna element.

At operation 515 the communication signal is passed through a communication channel in the transmit/receive module which comprises a circulator/isolator assembly. As described herein, the circulator/isolator assembly comprises a first magnetic substrate having a first surface and a second surface and a first ground plane formed on the first surface, a dielectric layer disposed adjacent the first magnetic substrate, the dielectric layer comprising a multi-port junction circuit coupled to a plurality of RF transmission traces, one of the traces forming an input port and a different one of said traces forming an output port, and a first magnet disposed proximate the multi-port junction circuit of the dielectric layer, such that the first magnet excites a circular, unidirectional magnetic flux field in the first magnetic substrate that limits electromagnetic wave propagation to a single direction of the multi-port circuit junction circuit.

Thus, described herein are novel structures for circulator/isolator assemblies which may be used in conjunction with phased array antennas. In accordance with the description provided herein, a circulator/isolator assembly may be constructed with the multi-port junction circuit 236 and the RF traces 238 disposed on the dielectric layer. This enables the multi-port junction circuit 236 and the RF traces 238 to be printed as a component of a circuit board rather than placed separately as a component of the substrate. In addition, this allows the use of a plain substrate layer 220. Advantageously, unlike a conventional circulator having a 3-port Y-junction circuit traces deposited on a ferrite substrate, the novel structure for a circular/isolator (e.g., circulator/isolator assembly 210) shares a same non-magnetic substrate with a printed circuit board containing one or more transmit/receive (T/R) channels. In addition, a ferrite substrate with only a metalized ground plane on one side can now be simply placed on top of a multi-junction circuit (e.g., multi junction trace) to achieve circulator/isolator functionality, e.g., unidirectional capability. Furthermore, advantageously, the disclosed circulator/isolator combined with prior art patents (e.g., 7,256,661, 7,495,521) incorporated by reference in their entirety will provide multi-channel functionality in a compact space; thus, this circulator/isolator device reduces antenna system overall footprint.

One skilled in the art will recognize that connections (e.g., ground connections, RF transmission connections) between the top surface 226 and the second surface 234 may be provided by metalized vias outside of the multi-port junction circuit 236 and RF transmission lines 238 (e.g., RF transmission traces). Alternatively, other mechanisms such as a metal casing wrapping the top surface 226 and the second surface 234 together without getting too close to the ports of 238 so as to provide needed connectivity there between.

Figure 6:
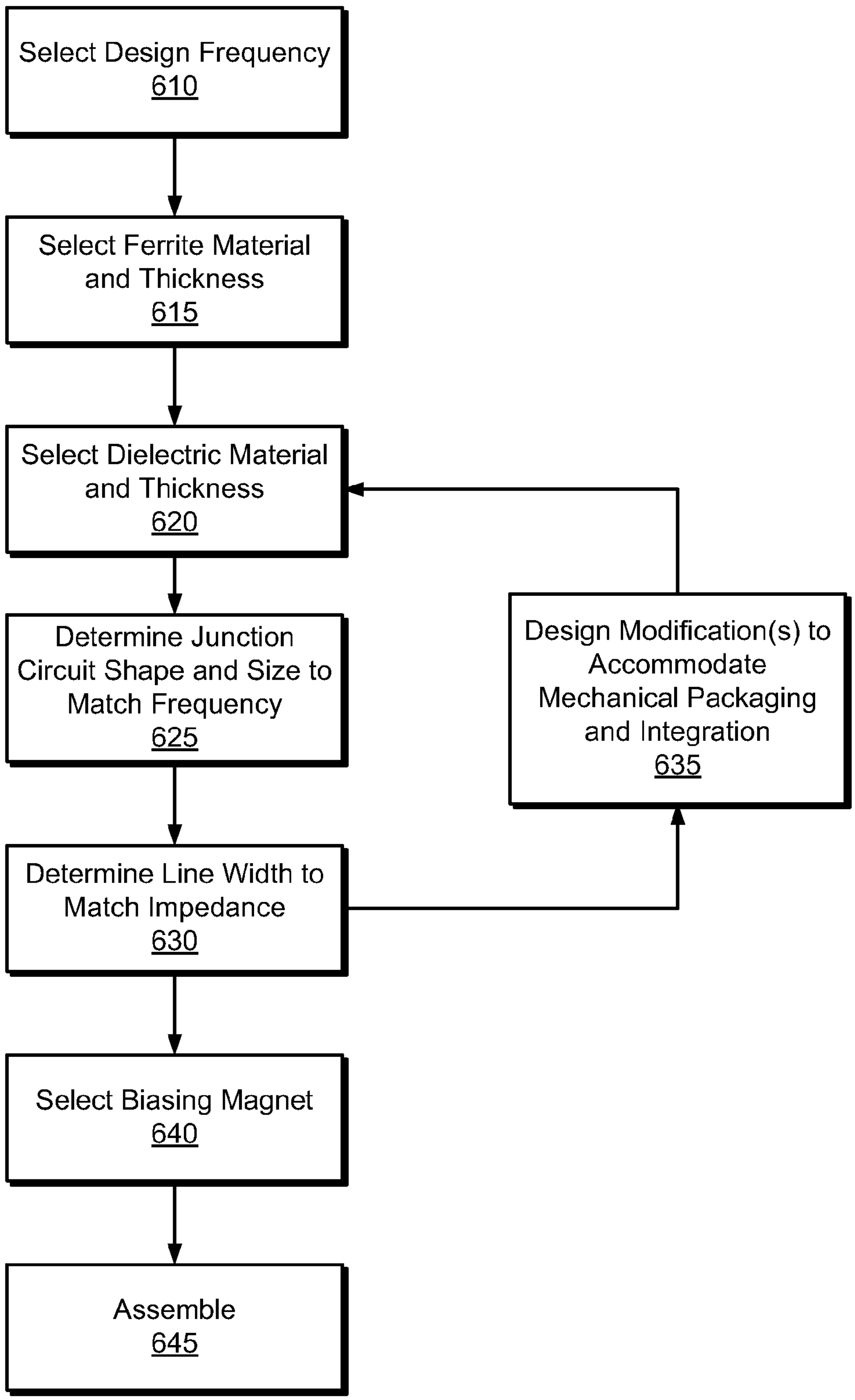
FIG. 6 is flowchart illustrating operations in a method make a circulator/isolator assembly accordance with various embodiments.

FIG. 6 is flowchart illustrating operations in a method make a circulator/isolator assembly accordance with various embodiments. Referring to FIG. 6, at operation 610 a design frequency for the circulator/isolator assembly 210 is selected. By way of example, in some embodiments the circulator/isolator assembly 210 may operate in a frequency range between 10 GHz and 30 GHz. At operation 615 a ferrite material for the magnetic substrate layer 220 is selected. Suitable materials include Yttirium-Iron-Garnet (YIG) single crystal ferrite materials. As described above with reference to FIG. 2I, the thickness of the substrate layer may measure between 0.01 inches and 0.05 inches.

At operation 620 a dielectric material is selected for the dielectric layer 230. Suitable materials include Rogers RO4003 laminate materials. As described above with reference to FIG. 2G, the thickness of the dielectric layer may measure between 0.01 inches and 0.1 inches.

At operation 625 the shape and size of the junction circuit 236 is selected. In some embodiments the shape and size of the junction circuit 236 is selected such that the circular dielectric resonator structure has a $TM_{110}$ mode resonance frequency that matches the operating frequency requirement selected in operation 610.

By way of example, the theoretical approximate formula for the microstrip dielectric resonator diameter is given by equation (1):

$$R = \frac{1.84c}{2\pi f\sqrt{D_k}} \quad (1)$$

where R is the radius of the metal junction disk, c is the speed of light in free space, f is the frequency of the resonance, $D_k$ is the effective dielectric constant of the ferrite material. By way of example, for a design frequency of f=17.36 GHz, and a ferrite material having a dielectric constant $D_k$=12, therefore the radius R is found to be 0.0575 in, so the diameter is 0.115 in.

At operation 630 the line width of the circuit traces 238 may be determined. In some embodiments the line width of the circuit traces may be selected to match a desired characteristic impedance, e.g., 50 ohms.

In some embodiments design modifications (operation 635) may be implemented to accommodate mechanical packaging and integration of the circulator/isolator assembly 210. By way of example, the structure may be tuned using simulation software to achieve a desired RF performance. At operation 640 a biasing magnet is selected and at operation 645 the circulator/isolator assembly 210 is assembled.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment. Each of the steps described in the above method are part of a sample exemplary embodiment. The order, positioning, and break-down of the steps of the above described method are exemplary only, e.g., each of the above disclosed steps are interchangeable, reorderable, replaceable, removable, and combinable. As such, this method is indicative of one exemplary process for manufacturing a circulator/isolator in accordance with the teachings of the specification.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:

a first magnetic substrate having a first surface opposite a second surface, wherein a first ground plane is formed on the first surface, wherein the first magnetic substrate is not electrically coupled to any radiofrequency (RF) trace via the first surface, wherein the first magnetic substrate is not electrically coupled to any RF trace via the second surface, and wherein each of the first surface and the second surface has a hexagonal shape;

a dielectric layer comprising a multi-port junction circuit disposed on a first side of the dielectric layer, wherein the multi-port junction circuit is dimensioned to be resonant within a first frequency range, wherein the first side faces the second surface, wherein the multi-port junction circuit is coupled to a plurality of RF transmission traces, wherein a first RF transmission trace of the plurality of RF transmission traces forms an input port, and wherein a second RF transmission trace of the plurality of RF transmission traces forms an output port, and wherein each of the first side and a second side of the dielectric layer has the hexagonal shape;

a second ground plane disposed on the second side of the dielectric layer; and a first magnet proximate to the multi-port junction circuit of the dielectric layer, such that the first magnet is configured to excite a unidirectional magnetic flux field in the first magnetic substrate that limits electromagnetic wave propagation to a single direction in the multi-port junction circuit.

2. The apparatus of claim 1, wherein a distance from a first edge of the dielectric layer to a second edge of the dielectric layer has a first value and a distance from a first edge of the first magnetic substrate to a second edge of the first magnetic substrate has a second value, wherein the first value is substantially equal to the second value, and wherein the first value is between 0.05 inches and 0.1 inches.

3. The apparatus of claim 1, wherein a distance from the first side of the dielectric layer to the second side of the dielectric layer has a first value, and wherein a distance from the first surface of the first magnetic substrate to the second surface of the first magnetic substrate has a second value that is smaller than the first value.

4. The apparatus of claim 3, wherein the first value is between 0.02 inches and 0.05 inches, and wherein the second value is between 0.01 inches and 0.03 inches.

5. The apparatus of claim 1, wherein the first magnetic substrate comprises a first material, the first material including yttrium iron garnet.

6. The apparatus of claim 5, wherein the dielectric layer comprises a second material distinct from the first material.

7. The apparatus of claim 6, wherein the second material includes polytetrafluoroethylene.

8. The apparatus of claim 1, wherein the multi-port junction circuit includes a conductive disc coupled to the plurality of RF transmission traces.

9. The apparatus of claim 8, wherein the conductive disc has a resonance frequency of 17.36 gigahertz (GHz).

10. The apparatus of claim 8, wherein a radius of the conductive disc is selected based on the first frequency range, a dielectric constant of the conductive disc, or a combination thereof.

11. An antenna assembly, comprising:

a first radiating element;

a second radiating element; and a circulator/isolator assembly coupled to the first radiating element and to the second radiating element, the circulator/isolator assembly comprising:

a first magnetic substrate having a first surface opposite a second surface, wherein a first ground plane is formed on the first surface, wherein the first magnetic substrate is not electrically coupled to any radiofrequency (RF) trace via the first surface, wherein the first magnetic substrate is not electrically coupled to any RF trace via the second surface, and wherein each of the first surface and the second surface has a hexagonal shape;

a dielectric layer comprising a multi-port junction circuit disposed on a first side of the dielectric layer, wherein the multi-port junction circuit is dimensioned to be resonant within a first frequency range, wherein the first side faces the second surface, wherein the multi-port junction circuit is coupled to a plurality of RF transmission traces, wherein a first RF transmission trace of the plurality of RF transmission traces forms an input port, wherein a second RF transmission trace of the plurality of RF transmission traces forms an output port, and wherein each of the first side and a second side of the dielectric layer has the hexagonal shape;

a second ground plane disposed on the second side of the dielectric layer; and a first magnet proximate to the multi-port junction circuit of the dielectric layer, such that the first magnet is configured to excite a unidirectional magnetic flux field in the first magnetic substrate that limits electromagnetic wave propagation to a single direction in the multi-port junction circuit.

12. The antenna assembly of claim 11, wherein the first frequency range is between 10 gigahertz (GHz) and 30 GHz.

13. The antenna assembly of claim 11, wherein the first magnet is disposed on the first ground plane.

14. The antenna assembly of claim 11, wherein the first magnet is disposed on the second ground plane.

15. The antenna assembly of claim 14, further comprising a second magnet.

16. The antenna assembly of claim 15, wherein the second magnet is disposed on the first ground plane.

17. The antenna assembly of claim 11, wherein a distance from a first edge of the first ground plane to a second edge of the first ground plane has a first value that is less than a distance from a first edge of the first magnetic substrate to a second edge of the first magnetic substrate.

18. The antenna assembly of claim 11, further comprising a second substrate disposed adjacent the first magnet.

19. The antenna assembly of claim 11, wherein a width of the multi-port junction circuit is such that the multi-port junction circuit exhibits an impedance of 50 ohms.

20. A method comprising:

receiving a communication signal; and passing the communication signal through a circulator/isolator assembly, wherein the circulator/isolator assembly comprises:

a first magnetic substrate having a first surface opposite a second surface, wherein a first ground plane is formed on the first surface, wherein the first magnetic substrate is not electrically coupled to any radiofrequency (RF) trace via the first surface, wherein the first magnetic substrate is not electrically coupled to any RF trace via the second surface, and wherein each of the first surface and the second surface has a hexagonal shape;

a dielectric layer comprising a multi-port junction circuit disposed on a first side of the dielectric layer, wherein the multi-port junction circuit is dimensioned to be resonant within a first frequency range, wherein the first side faces the second surface, wherein the multi-port junction circuit is coupled to a plurality of RF transmission traces, wherein a first RF transmission trace of the plurality of RF transmission traces forms an input port, wherein a second RF transmission trace of the plurality of RF transmission traces forms an output port, and wherein each of the first side and a second side of the dielectric layer has the hexagonal shape;

a second ground plane disposed on the second side of the dielectric layer; and a first magnet proximate to the multi-port junction circuit of the dielectric layer, such that the first magnet is configured to excite a unidirectional magnetic flux field in the first magnetic substrate that limits electromagnetic wave propagation to a single direction in the multi-port junction circuit.

21. The method of claim 20, wherein the communication signal is received from an external device via a wireless communication link.

22. The method of claim 20, wherein the communication signal is generated in a device coupled to the circulator/isolator assembly.

23. The apparatus of claim 1, wherein the first magnet proximate to the multi-port junction circuit of the dielectric layer is in contact with the multi-port junction circuit.

* * * * *